United States Patent
Segasby

(10) Patent No.: US 6,334,836 B1
(45) Date of Patent: Jan. 1, 2002

(54) MOTION PRODUCING MECHANISM AND FITNESS MACHINE INCORPORATING SAME

(75) Inventor: Mark Segasby, Collingham (GB)

(73) Assignee: Technogym S.r.l., Gambettola (Forli) (IT)

( * ) Notice: Subject to any disclaimer, the term of this patent is extended or adjusted under 35 U.S.C. 154(b) by 0 days.

(21) Appl. No.: 09/462,637
(22) PCT Filed: Jul. 8, 1998
(86) PCT No.: PCT/GB98/02007
§ 371 Date: Jan. 11, 2000
§ 102(e) Date: Jan. 11, 2000
(87) PCT Pub. No.: WO99/03727
PCT Pub. Date: Jan. 28, 1999

(30) Foreign Application Priority Data

Jul. 14, 1997 (GB) .............................................. 9714719

(51) Int. Cl.$^7$ ................................................. A63B 2/00
(52) U.S. Cl. ................................ 482/4; 482/8; 482/51; 482/57
(58) Field of Search ............................ 482/1–9, 51, 57, 482/60–66, 148

(56) References Cited

U.S. PATENT DOCUMENTS 2,088,332 A  7/1937  Marchou 5,419,572 A  5/1995  Stiller et al.

FOREIGN PATENT DOCUMENTS

| DE | 33 46 139 A1 | | 7/1985 | |
|----|----|----|----|----|
| DE | 3346139 | * | 7/1985 | ..................... 482/8 |
| EP | 0 386 847 | | 9/1990 | |
| EP | 0 761 528 A1 | | 3/1997 | |

* cited by examiner

Primary Examiner—Glenn E. Richman
(74) Attorney, Agent, or Firm—Arent Fox Kintner Plotkin & Kahn PLLC

(57) ABSTRACT

There is disclosed a mechanism adapted to produce a plurality of different motions of a member affording a point for application of a force comprising: fixed disc means held in a fixed orientation; and at least one moveable disc means adapted to rotate around its origin and around the origin of the fixed disc means under the influence of the applied force; in which: the ratio of the radius of the fixed disc means to the radius of the moveable disc means is 2:1; the position of the point which the force is applied to is radially variable relative to the origin of the moveable disc means; and the moveable disc means is in communication with the fixed disc means so that rotation of the moveable disc means around the origin of the fixed disc means at a frequency f causes rotation of the moveable disc means at a frequency of 2f.

13 Claims, 4 Drawing Sheets

MOTION PRODUCING MECHANISM AND FITNESS MACHINE INCORPORATING SAME

This application is the national phase of international application PCT/GB98/02007 filed Jul. 8, 1998 which designated the U.S.

This invention relates to a mechanism adapted to produce a plurality of different motions upon the application of a force thereto, with particular reference to fitness machines incorporating the mechanism.

There are numerous "fitness machines" commonly used in gymnasiums. Such machines comprise multi-purpose weightlifting equipment - often termed "multi-gyms" and various devices for improving aerobic fitness, such as exercise cycles, stepping machines and ski simulators, in which the action of cross country skiing is mimicked by, essentially, antiparallel linear translation of the user's feet. Recently, so-called "cross trainers" have appeared, in which motion induced by the user is substantially elliptical. If the user is upright when using a cross training device, the motion is in the form of a horizontal ellipse, i.e. the major axis of the ellipse is in the horizontal plane.

These aerobic fitness machines are usually manufactured as separate devices, each device being dedicated to a particular task. In part this is due to the nature of different tasks performed, which is in large measure due to the different motions performed during use: with an exercise cycle a circular motion is maintained, with a stepping machine the motion is (vertical) linear; with a ski simulator the motion is (horizontal) linear and with a cross trainer the motion is, as described above, elliptical.

It would be desirable to produce a multi purpose aerobic fitness machine for a number of reasons. Firstly, substantial cost savings would result if a single device were manufactured, rather than a plurality of dedicated devices, each performing a specific function. Secondly, the amount of space required would be drastically reduced. These advantages would make a multi-purpose aerobic fitness machine particularly attractive for use in the home. However, the provision of a practical driving mechanism, which could enable the above described plurality of motions to be produced in a single machine, is a particular problem.

The present invention overcomes the above mentioned problem by providing a simple and cost effective drive mechanism, together with fitness machines incorporating this drive mechanism and having the above mentioned advantages.

According to the invention there is provided a mechanism adapted to produce a plurality of different motions of a member affording a point of application for a force comprising:

fixed disc means held in a fixed orientation; and at least one moveable disc means adapted to rotate around its origin and around the origin of the fixed disc means under the influence of the applied force;

in which:

the ratio of the radius of the fixed disc means to the radius of the moveable disc means is 2:1;

the position of the point to which the force is applied is radially variable relative to the origin of the moveable disc means; and the moveable disc means is in communication with the fixed disc means so that rotation of the moveable disc means around the origin of the fixed disc means at a frequency f causes rotation of the moveable disc means at a frequency of 2f.

Preferably, the disc means comprise sprockets.

The position of the point which the force is applied to may be varied to produce linear. circular or elliptical motion. In this way, a plurality of different motions may be produced very easily, the type of motion being very easily changed by relatively small radial changes in the position of the point of application.

In one embodiment, the fixed sprocket has internal teeth, and the moveable sprocket is retained within the fixed sprocket in direct geared engagement therewith.

In another embodiment, the moveable sprocket is in communication with the fixed sprocket via a chain and a connecting crank. Tile mechanism may further comprise a rotatable crank in rigid connection with the moveable sprocket, the force being applied through the rotatable crank.

There is also provided a fitness machine incorporating a drive mechanism as described above. Such machines may be used as multi-purpose, aerobic fitness machines.

The member may comprise pedal means.

The fitness machine may be adapted to function as an exercise cycle, a stepping machine, a ski simulator and a cross training machine.

Furthermore, the machine may be adapted to produce motion on an ellipse having its major axis parallel to the body of the user.

The machine may be designed so that the user is recumbent.

The fitness machine may further comprise resistance means for inhibiting the rotation of the moveable disc means around the origin of the fixed disc means.

Embodiments of mechanisms and fitness machines according to the invention will now be described with reference to the accompanying drawings, in which:

FIG. 1 shows a mechanism adapted to produce a plurality of different motions of a member 10 affording a point of application for a force comprising:

a fixed sprocket 12 held in a fixed orientation; and a moveable sprocket 14 adapted to rotate around its origin and around the origin of the fixed sprocket 12 under the influence of the applied force;

in which:

the ratio of the radius of the fixed sprocket 12 to the radius of the moveable sprocket 14 is 2:1;

the position of the point to which the force is applied is radially variable relative to the origin of the moveable sprocket 14; and the moveable sprocket 14 is in communication with the fixed sprocket 12 so that rotation of the moveable sprocket 14 around the origin of the fixed sprocket 12 at a frequency f causes rotation of the moveable sprocket 14 at a frequency of 2f.

As shown in FIGS. 1a–d, the position of the point which the force is applied to may be varied to produce near linear (FIG. 1d), circular (FIG. 1a), and elliptical (FIGS. 1b and 1c) motion. This is achieved by radially varying the position of the member 10.

Figure 1:
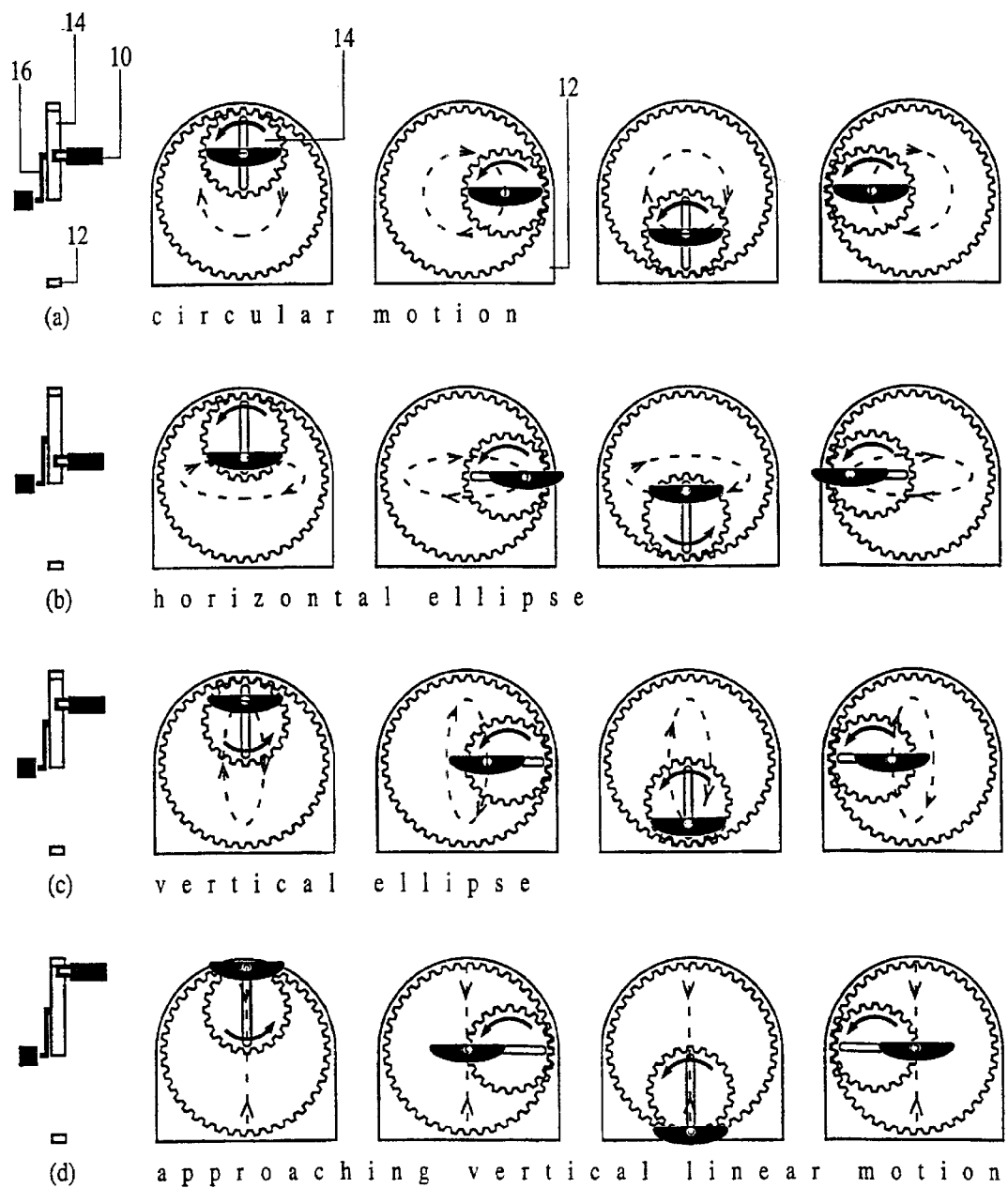
FIG. 1 shows a first embodiment of a mechanism adapted to produce a) circular, b) horizontal elliptical, c) vertical elliptical and d) near linear motion.

In the embodiment shown in FIG. 1, the fixed sprocket 12 has internal 12a, and the moveable sprocket 14 is retained within the fixed sprocket 12 in direct geared engagement therewith.

A simple crank system 16 permits the moveable sprocket to rotate around the origin of the fixed sprocket 12 when force is applied to member 10. The action of rotating around the origin of the fixed sprocket causes rotation of the moveable sprocket 14 around its own origin ("self-rotation") in the opposite sense. Thus, in FIG. 1, the moveable sprocket 14 is rotating clockwise about the origin of the fixed sprocket, with consequential self-rotation in an anticlockwise sense. The self rotation is at twice the frequency of the planetary-like rotation around the origin of the fixed sprocket 12 because of the 2:1 radius ratio. Therefore, over the course of a 90° rotation of the moveable sprocket about the origin of the fixed sprocket 12 there occurs self-rotation of the moveable sprocket of 180°. When the member 10 is at the origin of the moveable sprocket 14—as shown in FIG. 1*a*—the self-rotation is of no consequence, and circular motion results. However, if the point 10 is moved radially away from the origin of the moveable sprocket 14, the self rotation of the moveable sprocket 14 causes consequential rotation of the member 10 about its origin. This rotation acts to damp the circular rotation of the member 10 about the origin of the fixed sprocket 12. Depending on which way the member 10 is moved from the origin of the moveable sprocket 14, elliptical motion having a horizontal (FIG. 1*b*) or a vertical (FIG. 1*c*) major axis may be produced. If the member 10 were located on the circumference of the moveable sprocket, true linear motion would result. In practise, of course, the member will be located slightly less than a full radius from the origin of the moveable sprocket 14— as shown in FIG. 1*d*—producing substantially linear motion. It will be apparent that both horizontal and vertical linear motion may be produced.

Although the primary purpose of the mechanism is to serve as the basis of a multi-purpose fitness device, it will be appreciated that it is not limited in this regard. Furthermore, it will be appreciated that although the mechanism can function, as described above, to channel an applied force into a variety of different motion types (resulting in rotational motion of the moveable sprocket 14 and crank system 16), it might in principle be used to perform the process in reverse, i.e. rotational motion might be converted into variety of different motions.

Figure 2:
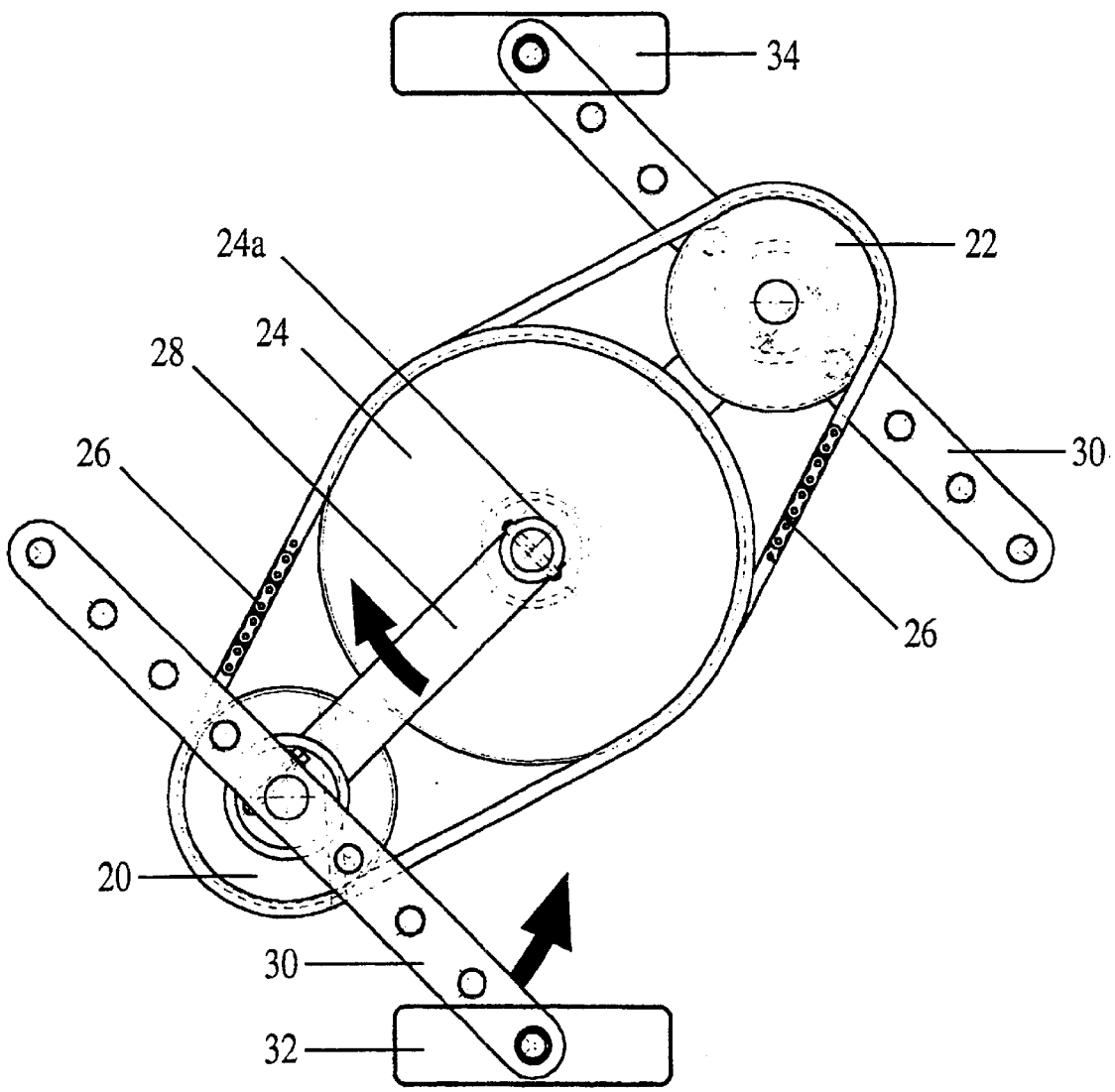
FIG. 2 shows a second embodiment of a mechanism like that of FIG. 1.
Figure 3:
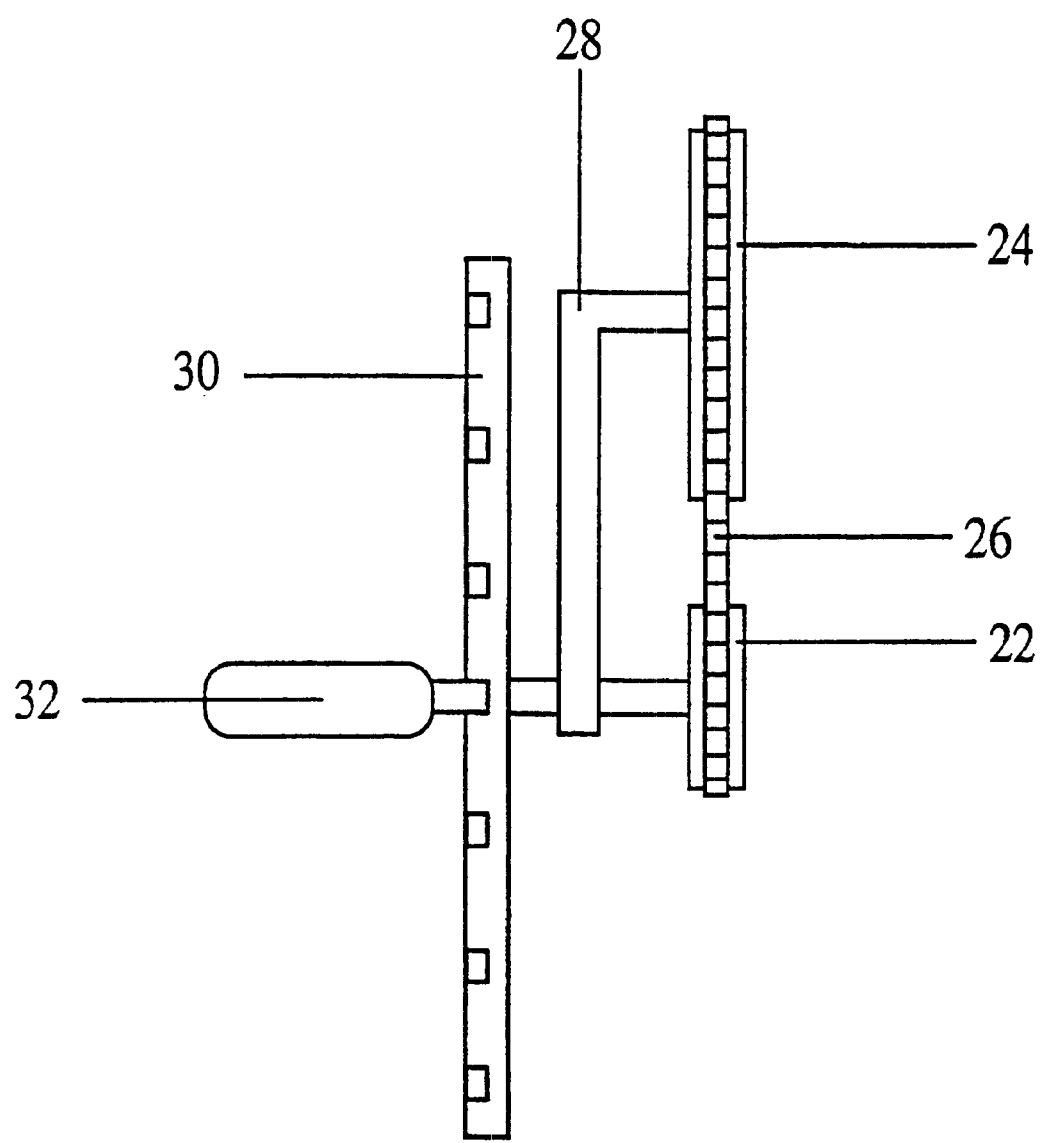
FIG. 3 shows a side view of the second embodiment.
Figure 4:
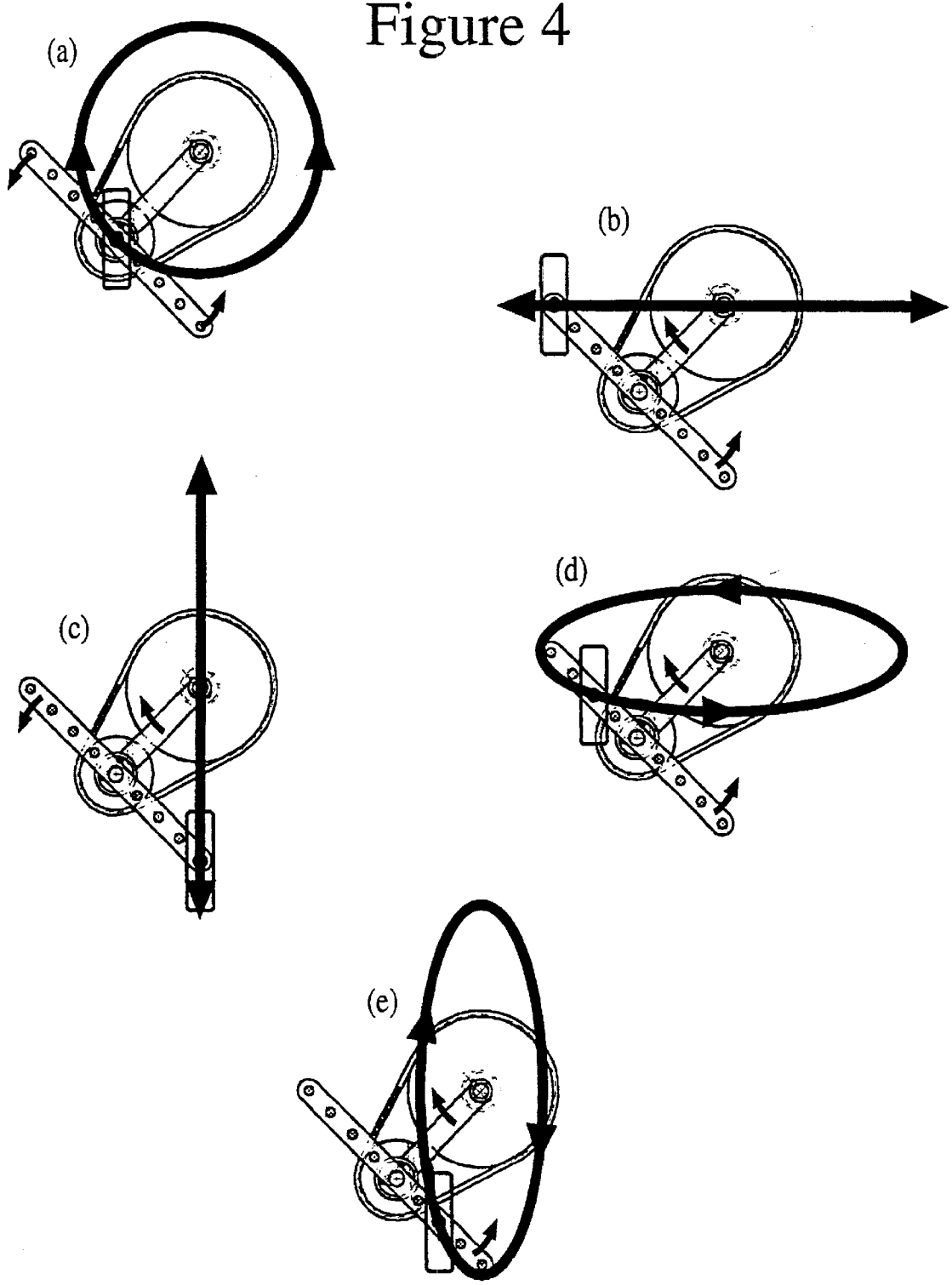
FIG. 4 shows the second embodiment adapted to produce a) circular, b) horizontal linear, c) vertical linear, d) horizontal elliptical and c) vertical elliptical motion.

FIG. 2 shows another embodiment of the mechanism in which having two moveable sprockets 20, 22, each in communication with a fixed sprocket 24 via a chain 26 and a connecting crank 28. The mechanism further comprises rotatable cranks 30 in rigid connection with the moveable sprockets 20, 22, the force being applied through the rotatable cranks 30 via members 32, 34. FIG. 3 shows a side view of the mechanism, with only one of the moveable sprockets 22 being shown for reasons of simplicity.

The mechanism depicted in FIG. 2 operates in analogous fashion to the mechanism shown in FIG. 1. Application of a force at, say, member 32 causes the moveable sprocket 26 to rotate around fixed sprocket 24 via rotation of the connecting crank 28. Note that connecting crank 28 passes through an aperture 24*a* of fixed sprocket 24. This planetary rotation results in self rotation of the moveable sprocket 20 and hence the rotatable crank 30. Since the ratio of the radius of the fixed sprocket 24 to the radii of the moveable sprockets 20, 22 is 2:1, this self-rotation is at twice the frequency of the planetary rotation.

Once again, it is possible to produce a variety of motions by varying the radial position of the members 32, 34 with respect to the origin of the corresponding moveable sprocket 20, 22. In this embodiment, the radial positioning is performed by varying the position of the member 32, 34 on the rotatable crank 28. FIGS. 4*a–e* depict the radial positions of the member 32 required to produce circular, horizontal linear, vertical linear, horizontal elliptical and vertical elliptical motion, respectively.

Either of the above described embodiments can be incorporated into a fitness machine. In this instance, two moveable sprockets are used, and the members at which force is applied, in order to rotate the moveable sprocket, will usually comprise pedal means of some suitable form. (However, in principle, a fitness machine for the exercising of arms might be envisaged, in which the pedal means are replaced by some form of handgrip). Numerous ways of radially varying the position of the pedal means suggest themselves: for example, a series of apertures maybe provided in the moveable sprocket or rotatable crank (as shown in FIG. 2); or a slot may be provided (as shown in FIG. 1). A fitness machine might comprise a single fixed sprocket having two sets of teeth, this fixed sprocket being in communication with both moveable sprockets. Alternatively, two drive mechanisms might be used in tandem, in which instance a single moveable sprocket would be in communication with each fixed sprocket.

As described above, mechanisms of the present invention can provide circular, vertical linear, horizontal linear and horizontal elliptical motion. Therefore, fitness machines incorporating the mechanism can be adapted to function as an exercise cycle, a stepping machine, a ski simulator and a cross training machine. Note that "vertical" linear motion is required for a stepping machine function if the user is in an upright position. However, it is not necessary that the user is in an upright position: in fact, in a preferred embodiment of a fitness machine of the present invention the user is in a recumbent position. More rigorously, for a stepping machine function the linear motion should be parallel to the body of the user, whilst in a ski simulator the linear motion should be perpendicular to the body of the user. Furthermore, the mechanism, can provide "vertical" elliptical motion, permitting the provision of a new fitness function in which motion on an ellipse having its major axis parallel to the body of the user is produced.

If the mechanism is stationary, and the applied force is wholly directed toward the origin of the fixed sprocket, then no rotational motion can be produced in the moveable sprocket. To commence rotation in this instance, the pedal can be rotated so that the applied force is no longer directed in this manner. Thereafter, the momentum gained can be relied upon to carry the moveable sprocket away from the above described position. Alternatively, stoppers may be used to prevent the alignment of the applied force with the origin of the fixed sprocket, although this approach would not be suited to the exercise bike function.

Typically, a fitness machine further comprises resistance means for inhibiting the rotation of the moveable sprocket around the origin of the fixed sprocket. Preferably, the resistance is variable, so that the user can select the level of resistance to motion to suit his/her level of fitness.

Further adaptions of the embodiments described herein would suggest themselves to those skilled in the art. For example, it will be apparent that, although the use of sprockets having teeth is preferred, other circular disc means might also be employed, such disc means having, for example, curved cut off portions on the circumference into which a belt can locate. It may be possible to employ a pulley system, provided there is sufficient friction between the pulley discs and the belt.

What is claimed is:

1. A mechanism for producing a plurality of different motions comprising:

a fixed disc means held in a fixed orientation;

at least one rotatable disc means engaged to said fixed disc means and moveable around the fixed disc means;

a member pivoted on the at least one rotatable disc means; and means for converting the rotary motion of the at least one rotatable disc means into an elliptical motion of the member.

2. The mechanism acccording to claim 1 in which the rotatable disc means comprises a rotatable sprocket and the fixed disc means comprises a fixed sprocket.

3. The mechanism according to claim 2 further comprising:

a chain engaged around the moveable and fixed sprockets; and a connecting crank to connect the center of the fixed sprockets with the center of the rotatable sprocket.

4. The mechanism according to claim 1, wherein the means for converting the rotary motion of the at least one rotatable disc means into the elliptical motion of the member comprises:

a rotatable crank connected to said at least one rotatable disc means and having a plurality of apertures said member being associated to said rotatable crank at one of said apertures disposed between the center of the rotatable disc means and an end of the rotatable crank.

5. A mechanism for producing a plurality of different motions comprising: a fixed disc means held in a fixed orientation; at least one rotatable disc means engaged to said fixed disc means and moveable around the fixed disc means; a member pivoted on the rotatable disc means; and means for converting the rotary motion of the rotatable disc means into a circular motion of the member.

6. The mechanism according to claim 5, wherein the means for converting the rotary motion of the rotatable disc means into a circular motion of the member comprises:

a rotatable crank connected to said rotatable disc means and having a plurality of apertures said member being associated to said rotatable crank at one of said apertures disposed in the center of the rotatable disc means.

7. The mechanism according to claim 5 in which the rotatable disc means comprises a rotatable sprocket and the fixed disc means comprises a fixed sprocket.

8. The mechanism according to claim 7, further comprising: a chain engaged around the moveable and fixed sprockets; and a connecting crank to connect the center of the fixed sprocket with the center of the rotatable sprocket.

9. A mechanism for producing a plurality of different motions comprising: a fixed sprocket having a plurality of internal teeth; at least one rotatable sprocket having a plurality of external teeth, said external teeth being engaged with the internal teeth of the fixed sprocket; a member pivoted on the rotatable disc means; and means for converting the rotary motion of the rotatable disc means into linear motion of the member.

10. The mechanism according to one of claims 1, 5 and 9, being incorporated in a fitness machine.

11. The mechanism of claim 10, in which the member comprises pedal means.

12. The mechanism according to claim 10, further comprising resistance means for inhibiting the rotation of the rotatable disc means around the fixed disc means.

13. The mechanism according to claim 9, wherein said means for converting the rotary motion of the rotatable disc means into the linear motion of the member comprises a pin associated to said member and connectable to a slot diametrally extending on the rotatable disc means; said pin being located at an extremity of said slot.

* * * * *